(12) United States Patent
Leclercq et al.

(10) Patent No.: US 9,934,499 B2
(45) Date of Patent: Apr. 3, 2018

(54) METHOD AND SYSTEM FOR PROVIDING A DIGITAL TICKET FOR ACCESS TO AT LEAST ONE DIGITAL OBJECT

(71) Applicant: ORANGE, Paris (FR)

(72) Inventors: Thierry Leclercq, Paris (FR); Vincent Auvray, Tonneville (FR)

(73) Assignee: Orange, Paris (FR)

( * ) Notice: Subject to any disclaimer, the term of this patent is extended or adjusted under 35 U.S.C. 154(b) by 725 days.

(21) Appl. No.: 14/387,737

(22) PCT Filed: Mar. 28, 2013

(86) PCT No.: PCT/FR2013/050674
§ 371 (c)(1),
(2) Date: Sep. 24, 2014

(87) PCT Pub. No.: WO2013/144514
PCT Pub. Date: Oct. 3, 2013

(65) Prior Publication Data
US 2015/0047052 A1 Feb. 12, 2015

(30) Foreign Application Priority Data
Mar. 29, 2012 (FR) ................................ 12 52875

(51) Int. Cl.
*G06F 21/10* (2013.01)
*G06Q 20/12* (2012.01)
*G06Q 30/06* (2012.01)

(52) U.S. Cl.
CPC ......... *G06Q 20/1235* (2013.01); *G06Q 30/06* (2013.01); *G06Q 30/0601* (2013.01)

(58) Field of Classification Search
USPC ............................................. 705/51
See application file for complete search history.

(56) References Cited

U.S. PATENT DOCUMENTS

| | | | | |
|---|---|---|---|---|
| 5,892,900 | A * | 4/1999 | Ginter .................... | G06F 21/10 726/26 |
| 8,090,802 | B1 | 1/2012 | Soelberg et al. | |
| 2002/0099663 | A1 | 7/2002 | Yoshino et al. | |
| 2003/0125964 | A1 | 7/2003 | Chang et al. | |
| 2005/0044361 | A1* | 2/2005 | Chang .................... | G06F 21/10 713/167 |
| 2005/0060640 | A1* | 3/2005 | Ross ................. | G06F 17/30029 715/201 |
| 2007/0192255 | A1* | 8/2007 | Ohmori .................. | G06Q 20/10 705/52 |

FOREIGN PATENT DOCUMENTS

WO    WO 2011/049999 A1    4/2011

* cited by examiner

*Primary Examiner* — Zeshan Qayyum
(74) *Attorney, Agent, or Firm* — Drinker Biddle & Reath LLP

(57) ABSTRACT

A method of providing a digital ticket allowing access to at least one digital object comprising the following steps: following a selection by a first user of at least one digital object, a step of submission of a request to a management server to obtain a digital ticket comprising a unique identification code, a first step of generation of said digital ticket, a first step of transmission of said digital ticket to the first user, and a step of activation of the digital ticket.

9 Claims, 2 Drawing Sheets

METHOD AND SYSTEM FOR PROVIDING A
DIGITAL TICKET FOR ACCESS TO AT
LEAST ONE DIGITAL OBJECT

CROSS-REFERENCE TO RELATED APPLICATIONS

This application is the U.S. national phase of the International Patent Application No. PCT/FR2013/050674 filed Mar. 28, 2013, which claims the benefit of French Application No. 12 52875 filed Mar. 29, 2012, the entire content of which is incorporated herein by reference.

FIELD

The object of the invention relates to the field of digital object distribution, and more specifically to the field of providing at least one digital object.

BACKGROUND

The object of the invention advantageously enables the development of new services for providing digital objects, for example by offering a person the possibility of giving one or more digital gifts to another person; more generally, the object of the invention proposes a new approach to the distribution chain for digital content in order to expand and enrich the products offered.

One aim of the invention is to allow a person to buy a digital object and give this digital object to another person.

For the purposes of the invention, in the following description "digital object" is understood to mean any digital object containing digital information, for example such as multimedia digital information. As non-limiting examples, the digital objects in the sense of the invention are digital content such as music, video, an e-book, software, an application, etc.

Currently, a large majority of systems for the distribution of digital objects consist of integrated and vertical systems. In this type of system, the digital object distribution chain is controlled by a single party which manages the digital content from publishing to distribution.

The parties in this growing market often provide proprietary distribution systems in which the digital objects offered have their own file format that can only be read by a device that is also supplied by the distributor.

This prevents the customer from accessing the object on devices other than the one originally provided for this purpose, which also prevents the customer from giving this digital object to another party, as the other party in principle does not have the right device.

For example, in the field of e-book distribution, when a consumer has chosen an e-book reader (a device for reading digital books) and has purchased one or more digital books, the device is tied to these books for the entire life of the books. If the consumer wants to change e-book readers, all these books could be lost; alternatively, if the consumer wants to read one of these books on another e-book reader, he or she may be unable to do so due to access control or file format issues. Similarly, it is not possible under any circumstances to gift a book or books that he or she has bought. Furthermore, if the rights attached to a purchased book expire at the end of a specified period after purchase and the book is not read during that period, access to its content (read access) is no longer possible after this period.

Other, more open digital object distribution systems exist. In these systems, the role of the digital object distributor is distinct from that of the digital object seller. In such systems, it is the digital objects that are exchanged between distributors and sellers. Such systems therefore require a high level of interoperability between the various parties in this market, in particular where it impacts the manufacturers of the digital media consumption devices and the infrastructure of the distribution system or the format of the distributed files.

With such systems, there is an issue concerning the security of the digital objects that are exchanged and distributed: these digital objects have a market value that invites piracy.

Often, to avoid or at least limit this type of fraudulent activity, the distribution systems use files with digital rights management (DRM).

The principle of such digital rights management is based on the use of encrypted works combined with conditional access. The distributor that uses such access control issues a key for accessing the digital object in exchange for a proof of purchase or a subscription.

Access to the digital object is then only authorized for the device or the software identification certified by the supplier. Such access is cumbersome to manage, for both the distributor and the end user. Such security also makes it impossible to give gifts as mentioned above.

Indeed, integrating security as DRM files creates problems for the user, particularly when the user changes reading devices, and prevents certain consumer activities such as making gifts or loans.

The distribution systems of the prior art therefore have many disadvantages, both for the distributors and for the consumer who is usually mobile and changes devices relatively often.

Similarly, technical and security constraints of the prior art distribution systems make it impossible to perform certain consumer activities such as making gifts or loans. For all the various reasons stated above, if someone wants to buy an e-book as a gift for someone else, he or she cannot do so in the current digital object distribution systems. Similarly, these systems make it impossible to loan digital objects.

This is unfortunate. In the field of traditional book publishing, it is quite common to give a book as a gift. The same is true with video or audio: a CD or DVD is a regular gift. Unfortunately, no current digital object distribution system allows such gifting.

Similarly, there is no digital object distribution system that allows borrowing or renting a digital object, as is currently possible at a library or video rental outlet.

The object of the invention is to improve the current situation described above.

SUMMARY

For this purpose, the object of the invention concerns a method for providing a digital ticket allowing access to a digital object.

In the invention, a first user selects at least one digital object from a digital library.

This selection is preferably done over a communication network such as the Internet, via a graphical user interface such as a web page for example.

The first user may be provided with a communication terminal. In this embodiment, the selection is made directly by the user via the digital library by means of the communication terminal. Alternatively, the first user may go to a point of sale, for example a bookstore or some other store, and select the digital object using a communication terminal at the point of sale.

Following this selection, the provision method includes a step of submitting a request to a management server to obtain a digital ticket.

Following this request, the provision method includes a first generation step where the management server generates the digital ticket. In one particular embodiment, the management server stores the generated digital ticket.

In one particular embodiment, this digital ticket comprises a unique identification code which is associated with said at least one selected digital object.

Advantageously, if the first user has selected a plurality of digital objects, the digital ticket is associated with all of these digital objects. It therefore generally holds that a digital ticket is generated for the n selected digital objects, n being an integer greater than or equal to 1.

Next, the provision method comprises a first transmission step where the digital ticket is sent to the first user via the digital library.

The provision method further comprises a step of activating the digital ticket with a digital library manager; this activation enables access to said at least one digital object.

Typically, the use of a digital ticket in the distribution system described above enables direct or indirect access to said at least one digital object. As the digital ticket is associated with one or more selected digital objects, it is possible to access this or these digital object(s) by activating the digital ticket generated by the management server.

The provision method thus allows access to a large number of digital objects while maintaining flexibility in said access and security for the digital objects.

This series of technical steps, characteristic of the invention, therefore allows access to digital objects via a personal digital library manager.

As will be understood from the following, the use of such a digital ticket in an open distribution system sets aside the access restrictions of current systems. This makes it possible to diversify the ways in which digital objects can be consumed, expanding the possibilities offered.

In one particular embodiment, the digital ticket is transferable. In this case, the method according to the invention advantageously includes a second transmission step during which the first user sends the digital ticket to a second user, to enable the second user to access said at least one digital object.

The method of the invention thus facilitates consumer actions consisting of giving one or more digital objects to another person.

In one particular embodiment, the second user is provided with a digital media consumption device, which is a multimedia device able to read the contents of a digital object. Such a device may be, for example, a smartphone, a computer, an e-book reader, a tablet computer, or any other type of multimedia device which allows viewing and/or playing the contents of a digital object.

It is understood here that the activation step is carried out by the second user in his or her personal library manager. The transmission of this digital ticket thus allows another person to access one or more digital objects.

It is also understood that the first user can keep the digital ticket in order to activate the digital ticket and access the content of the digital object(s) himself or herself.

Advantageously, the identification code is selected from among a plurality of unique codes.

The management server may store or have access to a set of unique identification codes and then select, for example randomly, one of these codes when a digital ticket is generated.

In one particular embodiment, this code is an alphanumeric code that may have 16 characters for example.

The digital ticket may include other identifiers which allow identifying the transaction at a later time. It may, for example, comprise an alphanumeric transaction code uniquely identifying the transaction between the management server and the library. This transaction code can be provided to the first user via any means as proof of the transaction, in addition to the digital ticket.

Advantageously, the digital ticket is generated such that the identification code includes activation data containing information relating to usage rights for said at least one selected digital object. In other words, this code contains information concerning for example the length of time the digital ticket is valid or the period during which the one or more digital objects are accessible.

The digital ticket may therefore have a limited period during which it can be activated.

The inclusion of this type of information in the digital ticket makes it possible, for example, to allow reimbursement in case of loss or non-use or to propose special offers. It also allows the possibility of loaning digital objects: using this information, the digital content of a digital object can be made accessible for a predetermined period of time after activation.

Advantageously, the provision method comprises a second generation step where the management server generates personal read rights data. These data contain at least one item of information relating to the read rights for the selected digital object. In one particular embodiment, the management server stores the personal read rights data so generated.

In this advantageous variant, it is not the digital objects themselves that are exchanged, but the personal read rights data. This approach to the distribution of digital objects is advantageously usable in an open three-tier model.

In this case, and according to one variant, during the activation step the digital library manager submits the digital ticket to the management server for authentication, and depending on the result of the authentication, the management server returns to the digital library manager the personal read rights data associated with said at least one selected digital object in order to provide access to said at least one selected digital object.

This access occurs via the digital object distributor. Indeed, it is the digital object distribution server that stores the digital objects themselves which enables, based on the personal read rights data, the distribution of the digital object(s) associated with the digital ticket.

One can therefore see that, in the architecture proposed here, the digital object distributors, referred to as e-distributors, produce digital content in agreement with the publishers; the digital libraries, known as e-libraries or digital media stores, deal with selling the digital objects; and the management server manages the rights to the various digital objects and controls access to these objects, in particular by managing read rights and by managing and verifying digital tickets.

In this variant, the personal read rights data and the digital ticket are the basis for the management, distribution, security, and billing between the parties in the digital object distribution chain.

In one particular embodiment, during the activation step, the management server verifies the validity of the activation data; in particular the management server verifies the validity of the information concerning the usage rights for the selected digital object.

In other words, according to this variant, in order to access the content of the selected digital object, one simply needs to turn in the digital ticket to the management server via the digital library manager.

After the ticket is verified and validated (particularly the activation data) by the management server, the management server issues personal read rights to the end user. These rights must then be activated. Following this activation, the digital library manager receives from a digital distributor the digital object(s) selected.

In this variant, activation of the digital ticket provides personal read rights for the selected digital object.

The use of a digital ticket as described above integrates perfectly with an open three-tier distribution architecture, and allows expanding the possible modes of digital object consumption.

Correspondingly, the object of the invention relates to a computer program comprising instructions for executing the steps of the method as described above, in particular when the computer program is executed by a computer.

Such a computer program may use any programming language, and may be in the form of source code, object code, or an intermediate code between source code and object code such as a partially compiled form, or any other desirable form.

Similarly, the object of the invention relates to a computer-readable storage medium on which is stored a computer program comprising instructions for executing the steps of the method as described above.

The storage medium may be any entity or device capable of storing the program. For example, the medium may comprise a storage means such as ROM memory, for example a CD-ROM or a ROM microelectronic circuit, or a magnetic storage means, for example a diskette (floppy disk) or hard drive.

Or this storage medium may be a transmission medium such as an electrical or optical signal, such a signal possibly conveyed via an electrical or optical cable, by terrestrial or over-the-air radio. or by self-directed laser beam, or by other means. The computer program according to the invention may in particular be downloaded on a network such as the Internet.

Alternatively, the storage medium may be an integrated circuit in which the computer program is embedded, the integrated circuit being adapted for executing or for being used in the execution of the method in question.

The object of the invention also relates to the system for implementing the method described above. More specifically, the object of the invention relates to a system for providing a digital ticket allowing access to at least one digital object.

The system according to the invention comprises at least one digital library, a management server, and at least one digital library manager.

According to the invention, the digital library comprises a selection means configured to allow a first user to select at least one digital object.

The digital library also comprises a request creation and submission means that is configured to allow the creation then submission of a request to the management server. This request contains a message in which the library requests that the management server generate a digital ticket.

According to the invention, the management server comprises a first generating means configured to generate the digital ticket. In one particular embodiment, the first generating means is also configured to store the generated digital ticket. In one particular embodiment, said first generating means is configured so that the digital ticket comprises a unique identification code associated with said at least one selected digital object.

The management server further comprises a first transmission means configured to send the digital ticket to the digital library; the library comprises a second transmission means configured to send the digital ticket to the first user.

According to the invention, the digital library manager comprises an activation means configured to register and activate the digital ticket to enable access to said at least one digital object.

Advantageously, the first generating means is configured such that the identification code contained in the digital ticket is a secure code as defined above.

Advantageously, the first generating means is configured such that the identification code comprises activation data containing information relating to usage rights for said at least one selected digital object.

According to one advantageous embodiment, the management server has a second generating means configured to generate personal read rights data; these personal read rights data contain at least one item of information concerning the right to read said at least one selected digital object. In one particular embodiment, the second generating means is also configured for storing the personal read rights data.

Advantageously, these personal read rights data can contain an alphanumeric transaction code, such as a transaction number generated by the management server, and possibly transaction time information (date and possibly the time of the transaction).

In one particular embodiment, said at least one selected digital object is stored on a digital object distribution server. In this case, to access the digital object, the activation means is configured to submit the digital ticket to the management server for authentication; also in this case, the management server comprises a third transmission means configured to send, based on the result of the authentication, the personal read rights data associated with said at least one selected digital object to the digital library manager.

In this variant, activation of the digital ticket allows obtaining the personal read rights required to access said at least one selected digital object via the digital object distribution server. Indeed, once received, the digital library manager submits the personal read rights to the digital object distribution server, and, based on these rights, the user (in other words the first or second user) can obtain the selected digital object or objects in question from the digital object distribution server, receiving them in his or her digital library manager and possibly downloading them from it.

In one particular embodiment, the personal digital library manager is a remote server providing digital storage using cloud computing technology. Advantageously, said personal digital library manager thus represents a library in the cloud or some equivalent.

It is thus clear that in order to access said at least one selected digital object, according to the invention, the user connects to the personal digital library manager via his or her communication terminal. This connection advantageously occurs over the Internet via a Web interface.

Thus, through its various functional and structural aspects, the object of the invention simplifies exchanges between the various parties in the digital object distribution chain, and allows access to one or more digital objects by providing a digital ticket.

Such access via a digital ticket enables consumers to access digital objects without imposing the constraints encountered in the past with the prior art described above, and makes it possible to gift digital objects to another person.

The object of the invention thus provides a system for people to exchange digital objects, despite the objects being virtual.

The object of the invention offers the possibility of an exchange without an intermediary and without the two people concerned having to log on simultaneously, with the possibility of hiding the purchase price and allowing synchronous as well as asynchronous exchanges.

It should also be noted, as mentioned above, that the first user can keep the digital ticket to have strictly personal access to the selected objects.

BRIEF DESCRIPTION OF THE DRAWINGS

Other features and advantages of the invention will be apparent from the following description, provided with reference to the accompanying FIGS. 1 to 2 which illustrate an exemplary embodiment having no limiting character and in which.

DETAILED DESCRIPTION

Figure 1:
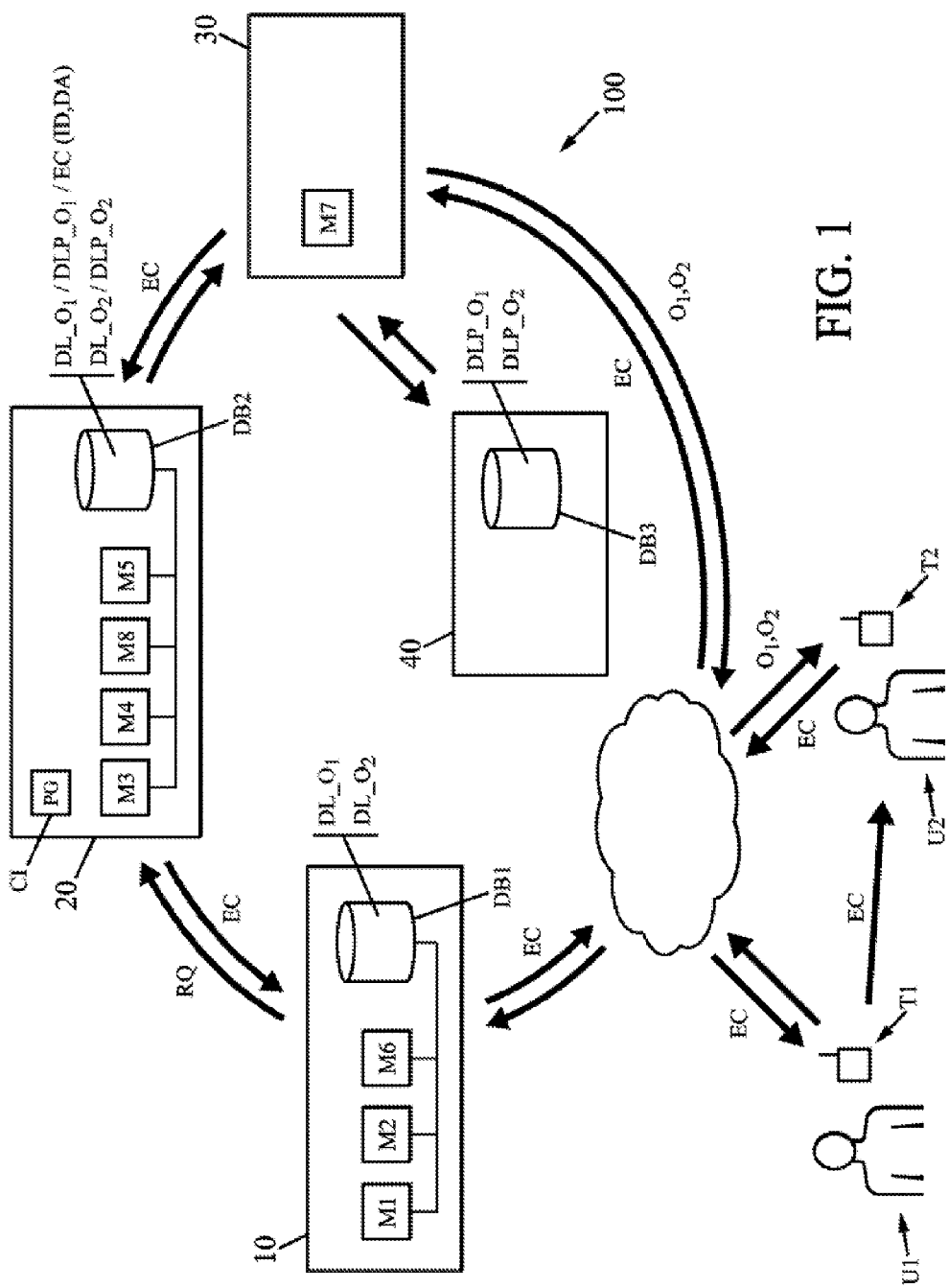
FIG. 1 schematically represents a system for providing a digital ticket allowing access to at least one digital object according to an advantageous exemplary embodiment of the invention.
Figure 2:
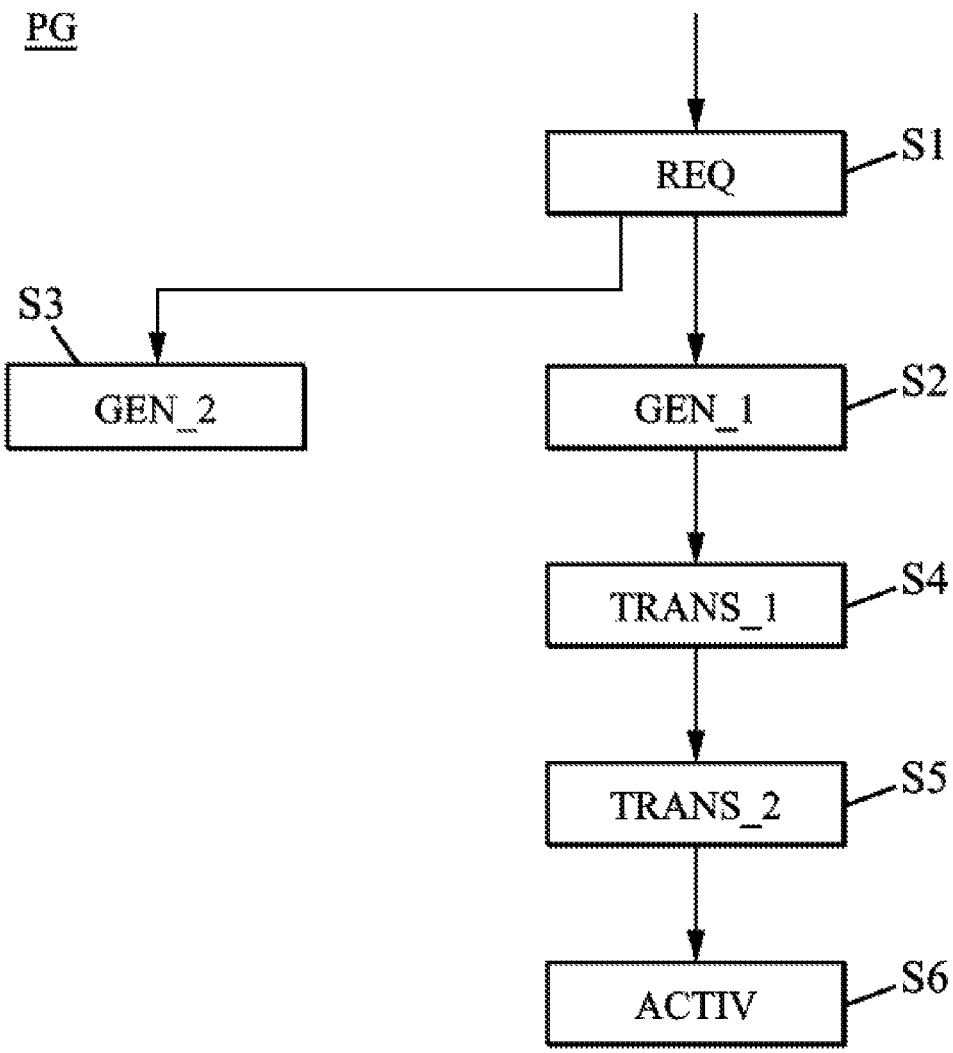
FIG. 2 schematically represents a flowchart illustrating the method for providing a digital ticket for accessing at least one digital object according to an advantageous exemplary embodiment of the invention.

A system and method for providing a digital ticket allowing access to the contents of at least one digital object, in accordance with an advantageous exemplary embodiment of the invention, will now be described below with reference to FIGS. 1 to 2.

As a reminder, one of the aims of the invention is to allow an end user to access and open at least one digital object while avoiding the various disadvantages identified above.

One of the other aims of the invention is to allow a person to gift one or more digital objects to another person.

More generally, the object of the invention is to expand and enrich the products offered in the digital object distribution chain.

For this purpose, the object of the invention proposes a "comprehensive" distribution system where the architecture comprises at least one digital library 10 (referred to herein as an e-library or digital media store), a management server 20 (also denoted as "NewCo"), at least one personal digital library manager 30, and at least one digital object distribution system 40 (referred to herein as an e-distributor). In this system, the management server 20 is configured to communicate with all parties in the chain.

In the embodiment described herein, this "comprehensive" distribution system is a system 100 for providing a digital ticket EC, also known as the "Ticket Code." This digital ticket EC is the foundation of the underlying concept of the invention: the digital ticket EC allows consumer activities such as gifting digital objects.

In the embodiment described herein, a first user U1 wants to give a second user U2 a digital object O1 (and/or O2). The digital object O1 (and/or O2) consists for example of an e-book. It is understood that the digital object O1 (and/or O2) can be any other type of digital object, such as those mentioned above: music, application, video, software, etc.

In the example described here, the first user U1 selects, via a first communication terminal T1 and a selection means M1 of the digital library 10, the digital object O1 (and/or O2) from among the digital objects O1 and O2. This selection is made directly in the library 10 over the Internet via a Web interface on terminal T1.

This selection step may be accompanied by a financial transaction step in which the first user U1 pays for the digital object O1 (and/or O2) selected from the digital library 10. This financial transaction step (not shown here) can be achieved using any payment method suitable for this purpose (Paypal account, credit card, mobile bank transfer, direct debit from bank account, etc.).

In the example described here, this selection is characteristic of the invention. Indeed, unlike the other systems proposed in the prior art, this selection does not consist of directly selecting the digital object O1 (and/or O2) itself, but consists of selecting only a data item containing information relating to the object O1 (and/or O2). As a non-limiting example, such a data item could contain information such as, for example, information relating to the title and/or author and/or publication date, and/or relating to an image or any other metadata-type data.

More specifically, in the embodiment described here, the digital library 10 contains a first database DB1 storing data items which each respectively contain information relating to the digital objects O1 and O2: here, these identification data are the read rights data DL_O1 and DL_O2 which contain information relating to the read rights for digital objects O1 and O2.

As an illustration, these read rights DL may include the following information: {"Puss in Boots", "Charles Perrault", "There was a miller whose only inheritance to his three sons [ . . . ]", "1699", ".pdf", . . . }. These read rights are managed by the e-distributors 40 with the permission of the publishers (not represented here).

In the example described here, one can therefore see that the digital library 10 contains the data DL_O1 and DL_O2 which respectively point and refer to the corresponding digital objects O1 and O2, the digital objects O1 and O2 themselves being stored at a digital object distributor 40 in a third database DB3.

This distinction between digital media stores 10 and e-distributors 40 allows clearly distinguishing between the roles of the various parties in the digital object distribution chain. Because of this distinction, it is possible to have multiple digital libraries and multiple digital object distributors, thereby broadening and enriching the offerings to the end consumers.

The digital media stores 10 are the faces visible to the consumer. Each digital media store 10 has a catalog of digital objects containing the metadata from the read rights DL_O1 and DL_O2 associated with objects O1 and O2.

The e-distributors are responsible for producing the actual digital content, usually in partnership or in cooperation with the publishers.

For clarity, the embodiment described herein is limited to an example with one digital library 10 (or digital media store) and one digital distributor 40 (or e-distributor).

In the example described here, the first user U1 selects, via the digital library 10, only the read rights data DL_O1 (and/or DL_O2) for the digital object O1 (and/or O2) he or she wants to gift, and not the actual digital object O1 (and/or O2).

Following this selection, the method according to the invention provides a submission step S1. In this step S1, a request RQ is sent to the management server 20 by a creation and submission means M2.

In the example described here, following the receipt of this request RQ, the first generating means M3 of the management server 20 generates and stores a digital ticket EC, in a first generation and storage step S2.

This digital ticket EC comprises a unique identification code ID associated with the selected digital object O1 (and/or O2).

Specifically, in the example described here, the identification code ID contains information relating to the read rights DL_O1 (and/or DL_O2), or at least information that subsequently allows a correlation between the digital ticket EC and the digital object O1 (and/or O2) that was previously selected by the first user U1.

In the example described here, the digital ticket EC contains no information about the identity of the first user U1. This first user U1 can therefore remain anonymous to the second user U2.

In the example described here, the identification code ID includes activation data DA containing information relating to usage rights for the selected digital object O1 (and/or O2): this data DA contains, for example, information on the period the ticket EC is valid. After this period, the ticket EC is no longer valid: in this case a refund can be considered.

The invention also provides a variant (not shown here) in which the read rights may be extended and/or expanded; this extension/expansion may for example be tacit or upon user request (the first, second, or any other user). In this case the manipulation is done through the digital media store 10.

The invention further provides traceability for acts of digital object consumption. In case of theft, the management server 20 can trace the ticket EC and its use, and establish an appropriate recovery procedure. The invention thus eliminates the risk of piracy that arises with unprotected files: it provides a level of security that is equivalent to systems protected by DRM (Digital Rights Management).

In one particular embodiment, the digital ticket EC consists of a secure alphanumeric code containing 16 characters. In the example described here, the information concerning the ticket EC is stored in a second database DB2.

In the example described here, still following the receipt of the request RQ, the management server 20 comprises a second generating means M5 which generates and stores, during a second generation and storage step S3, personal read rights data DLP_O1 (and/or DLP_O2) containing at least one item of information relating to the read rights for the selected digital object O1 (and/or O2).

The management server 20 generates the personal read rights data DLP_O1 (and/or DLP_O2) based on the read rights data DL_O1 (and/or DL_O2) of the selected digital object O1 (and/or O2).

For example, these data denoted as DLP (for "Droit de Lecture Personnel"=Personal read rights) are presented in the following form: DLP=DL+{"digital media store X", "purchase date=18 Nov. 2011" "usage rights=DA"}, where DA indicates activation data and DL indicates read rights.

The personal read rights data may also contain a transaction number internal to the system, corresponding to an order/transaction number generated by the management server and uniquely identifying the transaction/selection of the digital object concerned.

In the example described here, the personal rights data is stored in a second database DB2 in association with the ticket EC.

In parallel with this step S3, the management server 20 includes a first transmission means M4 which allows the execution of a first transmission step S4 in which the digital ticket EC is sent to the digital library 10.

This digital ticket EC is then returned (automatically) to the first user U1 by a second transmission means M6. This return can occur for example in a text message or an email.

A variant can also be provided in which a hard copy of the identification code ID contained in the digital ticket EC is sent to the first user U1, via the postal service for example.

It is therefore understood that the digital ticket EC is transferable. It is also characteristic that the method according to the invention comprises a second transmission step S5 in which the first user U1 sends the digital ticket EC to a second user U2.

This second transmission S5 embodies the actual act of giving.

Because of the generation of a digital ticket EC and its transmission by the first user U1 to the second user U2, the digital library where the digital object is selected is unaware of the end user. According to one particular embodiment, it is possible that the user U1 purchases one or more digital objects without necessarily knowing the user U2 they will be sent to: the method and system according to this embodiment can therefore be used for giveaways or lotteries.

More generally, the transmission of the digital ticket EC occurs for example in an email or a text message. This transmission of the digital ticket EC may further include information indicating the procedure for the holder of the ticket to access the selected digital object O1 (and/or O2) and possibly a summary about the gift.

This transmission can also be achieved by generating a letter containing the identification code ID and sending it by conventional mail.

Enabling access to the content of the digital object O1 (and/or O2) for the second user U2 is one of the aims of the invention.

To achieve this, the second user U2 obviously must already have access to a personal digital library manager 30, which he or she can be reminded of in the transmission as indicated above.

Using the activation means M7 of this manager 30, the second user U2 can, during an activation step S6, register and activate the digital ticket EC to initiate access to the digital object O1 (and/or O2).

Specifically, in the example described here, the activation means M7 submits the digital ticket EC to the management server 20. The management server 20 then authenticates the digital ticket EC for example by checking the validity of the activation data DA.

Next, the management server 20 includes a third transmission means M8 which, depending on the result of the authentication, sends to the digital library manager 30 the personal read rights data DLP_O1 (and/or DLP_O2) associated with the selected digital object O1 (and/or O2). It is this transmission of the personal read rights data DLP_O1 (and/or DLP_O2) which enables access to the selected digital object O1 (and/or O2).

Indeed, the digital library manager 30 which receives these data DLP_O1 (and/or DLP_O2) queries the digital object distribution server 40, which sends back the selected digital object O1 (and/or O2).

The second user U2 can then open the digital object O1 (and/or O2) gifted by the first user U1, via his or her second digital media consumption device T2, this second digital media consumption device being for example a smartphone, laptop, or e-book reader. Obviously, any other digital media consumption device can be considered in the context of this invention.

In one exemplary embodiment (not shown here), the selection of the aforementioned digital object can be done physically, directly at a point of sale, for example at a bookstore or any other retail outlet (superstore, department store, etc.) that is part of the distribution chain according to the invention. In this case, the first user does not need a communication terminal. However, the point of sale must be equipped with a PC-type communication terminal that is able to connect to the management server over a communication network.

In this variant, the point of sale must be registered with the management server in a configuration step, and a signature key is issued by the management server to the point of sale.

In this case, when a first user selects a digital object at the point of sale (such as an e-book or some other item), a communication terminal at the point of sale sends a digital object selection request to the management server. The communication terminal may be self-service, meaning it can be used directly by the user U1, or it may be reserved for the use of the store owner or staff member at the point of sale.

The request is signed using the key of the point of sale, to allow the management server to authenticate the point of sale. The point of sale can then print a document on which the generated digital ticket is printed. This document can be handed over to the first user U1 who can then give it to the second user U2 as explained above.

In any event, the gifted digital object O1 (and/or O2) can be opened, for example either by downloading or by streaming.

This series of technical steps is managed by a computer program PG, comprising instructions suitable for executing the steps of the method described above, which is contained on a storage medium CI.

Thus, the system 100 according to the invention provides the ability to isolate or at least partially isolate the personal read rights in an open model with at least three parties, in order to expand the possibilities for acts of consumption by allowing purchases intended for another person, meaning purchases that are a gift or loan, while providing a level of security that is equivalent to files protected with DRM.

It should be observed that this detailed description concerns a specific embodiment of the invention, but in no way does this description have any limiting character regarding the object of the invention; rather, it is intended to eliminate any ambiguities or any misinterpretations of the following claims.

The invention claimed is:

1. A method for providing a digital object, said method comprising the following steps:
    selecting, by a first communication terminal, at least one digital object from a digital library;
    submitting, by the first communication terminal, a request for a digital ticket to a management server for the at least one selected digital object;
    generating, by the management server, the digital ticket and a personal read right, wherein the digital ticket comprises a unique identification code that uniquely identifies said at least one selected digital object, and the personal read right is configured to enable access to said at least one selected digital object;
    transmitting, by the management server, the digital ticket to the first communication terminal via the digital library;
    forwarding, by the first communication terminal, the digital ticket to a second communication terminal;
    activating, by the second communication terminal, the digital ticket by registering the digital ticket with a digital library manager;
    forwarding, by the digital library manager, the digital ticket to the management server;
    authenticating, by the management server, the digital ticket;
    receiving, by the digital library manager, from the management server, and based on the authentication of the digital ticket, the generated personal read right;
    requesting, by the digital library manager, the at least one selected digital object by forwarding the received personal read digital right to a digital object distribution server;
    receiving, by the digital library manager, the at least one selected digital object corresponding to the personal read digital right from the digital object distribution server; and
    sending, by the digital library manager, the received digital object to the second communication terminal.

2. The method according to claim 1, wherein generating the digital ticket comprises generating the digital ticket such that the identification code includes activation data containing information relating to usage rights for said at least one selected digital object.

3. The method according to claim 1, wherein personal read rights data contain at least one item of information relating to the read rights for said at least one selected digital object.

4. The method according to claim 3, wherein, said at least one digital object being stored on the digital object distribution server, and the personal read rights data associated with said at least one selected digital object provide access to said at least one selected digital object via the digital object distribution server.

5. The method according to claim 4, wherein, generating the digital ticket comprises generating the digital ticket such that the identification code includes activation data containing information relating to usage rights for said at least one selected digital object, and, wherein, authenticating the digital ticket comprises verifying the validity of the activation data.

6. A system for providing at least one digital object, said system comprising:
    a first communication terminal, which comprises a first communication terminal processor and first communication terminal memory, wherein the first communication terminal memory stores executable instructions that when executed by the first communication terminal processor, cause the first communication terminal processor to perform the steps of:
        selecting, at least one digital object from a digital library;
        submitting, a request for a digital ticket to a management server for the selected at least one digital object;
        receiving, the digital ticket from the management server via the digital library;
        forwarding, the digital ticket to a second communication terminal; the management server, which comprises a management server processor and a management server memory, wherein the management server memory stores executable instructions that when executed by the management server processor, cause the management server processor to perform the steps of:

generating the digital ticket and a personal read right, wherein the generated digital ticket comprises a unique identification code that uniquely identifies said at least one selected digital object, and the personal read right is configured to enable access to said at least one selected digital object;

transmitting the digital ticket to the first communication terminal;

receiving the digital ticket from a digital library manager;

authenticating the digital ticket;

transmitting based on the authentication of the digital ticket the generated personal read right to the digital library manager;

the digital library manager, which comprises a digital library manager processor and a digital library manager memory, wherein the digital library manager memory stores executable instructions that when executed by the digital library manager processor, cause the digital library manager processor to perform the steps of:

receiving the digital ticket from the second communication device;

forwarding the digital ticket to the management server;

receiving from the management server, and based on the validation of the digital ticket, the generated personal read right;

requesting, the digital object by forwarding the received personal read digital right to a digital object distributor;

receiving, the digital object corresponding to the personal read digital right from the digital object distributor;

sending, the received digital object to the second communication terminal;

the second communication terminal, which comprises a second communication terminal processor and second communication terminal memory, wherein the second communication terminal memory stores executable instructions that when executed by the second communication terminal processor, cause the second communication terminal to perform the steps of:

receiving the digital ticket from the first communication device;

activating, the digital ticket by registering the digital ticket with the digital library manager; and receiving the digital object from the digital library manager.

7. The system according to claim 6, wherein the identification code comprises activation data containing information relating to usage rights for said at least one selected digital object.

8. The system according to claim 6, wherein, said at least one digital object being stored on the digital object distributor and the personal read rights data associated with said at least one selected digital object to the digital library manager enable access to said at least one selected digital object via the digital object distributor.

9. The system according to claim 6, wherein the digital library manager comprises an activation module configured for verifying the validity of the activation data.

* * * * *